United States Patent [19]
Arendonk et al.

[11] Patent Number: 5,423,456
[45] Date of Patent: Jun. 13, 1995

[54] APPARATUS FOR CONTINUOUS FLOW WEIGHING

[75] Inventors: Larry V. Arendonk, 1109 Hazel St., Pella, Iowa 50219; Paul Schroder, Pella, Iowa

[73] Assignee: Larry V. Arendonk, Pella, Iowa

[21] Appl. No.: 176,200

[22] Filed: Jan. 3, 1994

[51] Int. Cl.⁶ .............................. G01F 1/08
[52] U.S. Cl. ........................ 222/54; 222/55; 222/56; 222/238
[58] Field of Search ............. 222/54, 55, 56, 238, 222/413

[56] References Cited

U.S. PATENT DOCUMENTS

| | | | |
|---|---|---|---|
| 2,753,099 | 7/1956 | Jenner et al. | 222/55 |
| 3,403,824 | 10/1968 | Biehl | 222/238 |
| 3,653,544 | 4/1972 | Young et al. | 222/55 |
| 3,786,961 | 1/1974 | Wahl et al. | 222/55 |
| 3,804,298 | 4/1974 | Ricciardi | 222/56 |
| 4,163,489 | 7/1979 | Wahl | 222/55 |
| 4,232,781 | 11/1980 | Muller | 222/55 |
| 4,579,252 | 4/1986 | Wilson et al. | 222/56 |
| 4,771,915 | 9/1988 | Cand et al. | 222/56 |
| 5,184,754 | 2/1993 | Hansen | 222/56 |

FOREIGN PATENT DOCUMENTS 5151447 6/1993 Japan .................. 222/56

*Primary Examiner*—Andres Kashnikow
*Assistant Examiner*—Kenneth Bomberg
*Attorney, Agent, or Firm*—Kent A. Herink; Brian J. Laurenzo

[57] ABSTRACT

Apparatus for continuous flow weighing of a flowable material includes a pair of sequential conveyors. A first, control conveyor moves material from an inlet to a discharge point. A second, weighing conveyor is mounted for pivotal movement about a horizontal axis at its inlet end. The pivot point is positioned below the discharge of the control conveyor. The outlet end of the weighing conveyor is suspended from and weighed by a load cell. Electronic control circuitry monitors the material transport rate of the weighing conveyor which, in combination with the output of the loadcell, is used to determine the weight flow rate of material being discharged from the weighing conveyor. The material transport rate of the weighing auger is adjusted to result in a preselected weight flow rate.

19 Claims, 5 Drawing Sheets

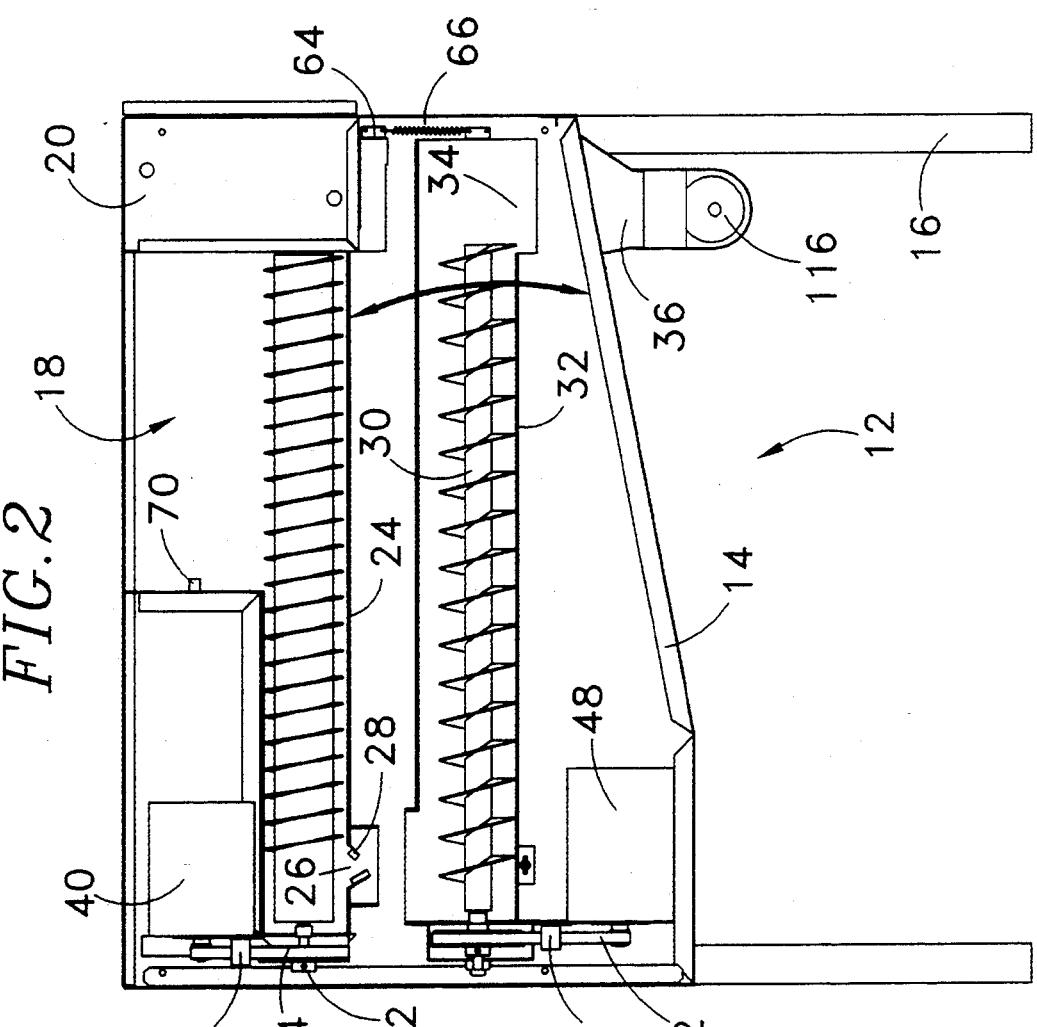

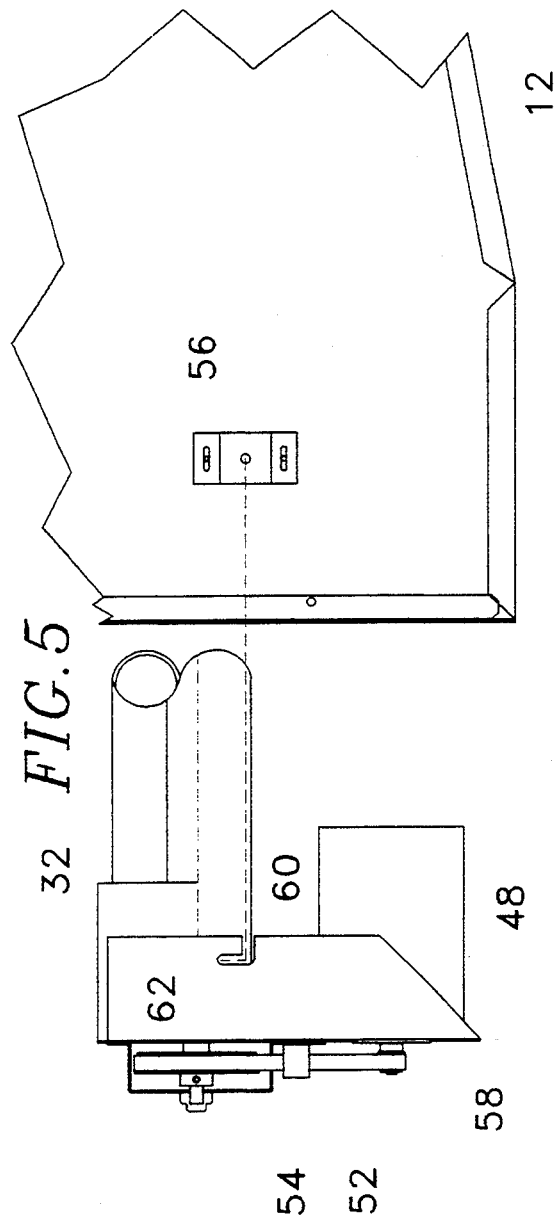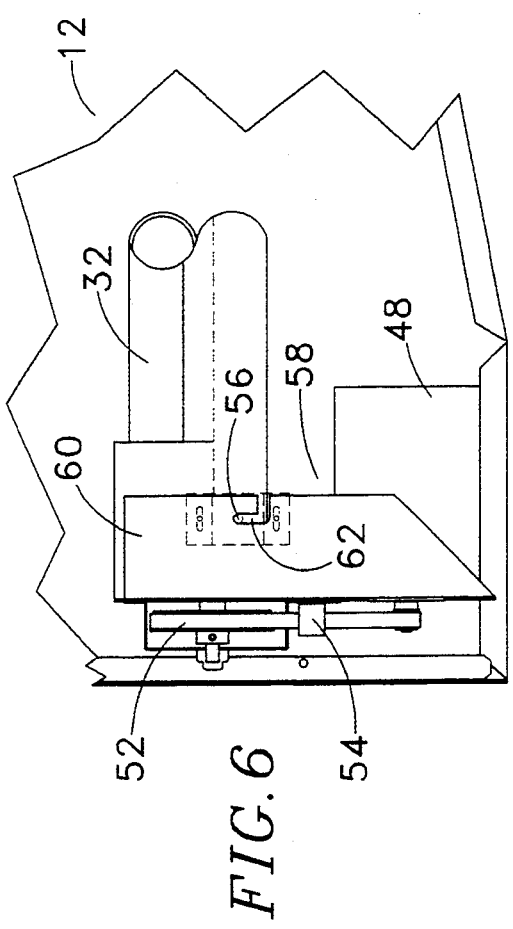

APPARATUS FOR CONTINUOUS FLOW WEIGHING

BACKGROUND OF THE INVENTION

The invention relates generally to apparatus for preparing on a continuous basis, mixtures of a plurality of constituent materials and, more specifically, to apparatus for continuous flow weighing of a dry flowable material for addition in a desired proportion to a mixture.

Mixtures or rations are typically made by mixing multiple ingredients by either the technique of batching by volume or weight or by the technique of continuous volumetric proportioning. Batching by volume or weight requires use of a batch mixer. Each ingredient is loaded into the mixer sequentially, the amount of each ingredient to be added is measured either by volume or, more accurately, by weight. After all of the ingredients have been loaded into the mixer, the mixer is operated until a homogeneous mixture of the ingredients is obtained.

The batching method provides for accurate measuring of ingredients and can be automated to load ingredients according to predefined recipes. Its disadvantages include the time required for sequential loading of ingredients, inaccuracy if ingredients are measured by volume, and operator error as is often the case with microingredients (i.e., ingredients added in very small proportional amounts).

The volumetric proportioning method does not require a mixer. Each ingredient flows simultaneously through separate augers into a common gathering auger. The flow rate of each ingredient is controlled by controlling the speed of the individual ingredient augers. Volumetric proportioning can be accomplished with a simple, compact system that does not require a mixer and which is potentially inexpensive to purchase and maintain. This method, however, has relatively low accuracy, being dependent on material flow characteristics and constancy of material density. Microingredients must typically be preblended into another ingredient to obtain the necessary minimum flow rates of the augers. Further, volumetric flow proportioning requires a separate metering auger for each ingredient.

SUMMARY OF THE INVENTION

The invention consists of an apparatus for continuous flow weighing of a particulate, flowable material and for controlling the flow of a particulate, flowable material at a preset weight flow rate. A control conveyor conveys the material from an input to the apparatus to an output end where it is discharged to the intake end of a weighing conveyor. The material is then conveyed by the weighing conveyor to its output end where it is discharged into a gathering conveyor. The weighing conveyor is mounted for pivotal movement about a horizontal axis located at the intake end of the weighing conveyor and below the output end of the control conveyor. The output end of the weighing conveyor is suspended from a load cell. The signal from the load cell is processed to determine the downward force from the weighing conveyor and is related to the weight of the material being conveyed by the weighing conveyor. The rotational speed of the weighing conveyor is also monitored and processed with the weight of material to determine the continuous mass flow rate of the material being discharged from the apparatus. The speed of the conveyors can be adjusted to provide a preselected mass flow rate for the material.

A plurality of the apparatuses can be interconnected by a common gathering conveyor so that a desired recipe of a plurality of ingredients is output from a common gathering conveyor.

An object of the invention is to provide an apparatus for continuous flow weighing of a flowable material.

Another object of the invention is to provide an apparatus for controlling the continuous mass flow rate delivery of a flowable material.

A further object of the invention is to provide an apparatus for the economical and accurate preparation of a homogeneous mixture of constituent ingredients such as feedstuffs, chemicals, plastic pellets, aggregates, and so forth.

These and other objects of the invention will be disclosed to persons skilled in the art upon a review and understanding of this description, the drawings, and associated claims.

BRIEF DESCRIPTION OF THE DRAWINGS

FIG. 2 is a cross-sectional elevational view taken along line 2—2 of FIG. 1.

FIG. 3 is an elevational end view of the apparatus with a panel removed to show a drive system for the apparatus.

FIG. 4 is an elevational end view of the apparatus showing a control panel of the invention.

FIGS. 5 and 6 are enlarged, detail views showing the mounting of a weighing conveyor for pivotal movement about a horizontal axis.

DETAILED DESCRIPTION OF A PREFERRED EMBODIMENT

Figure 1:
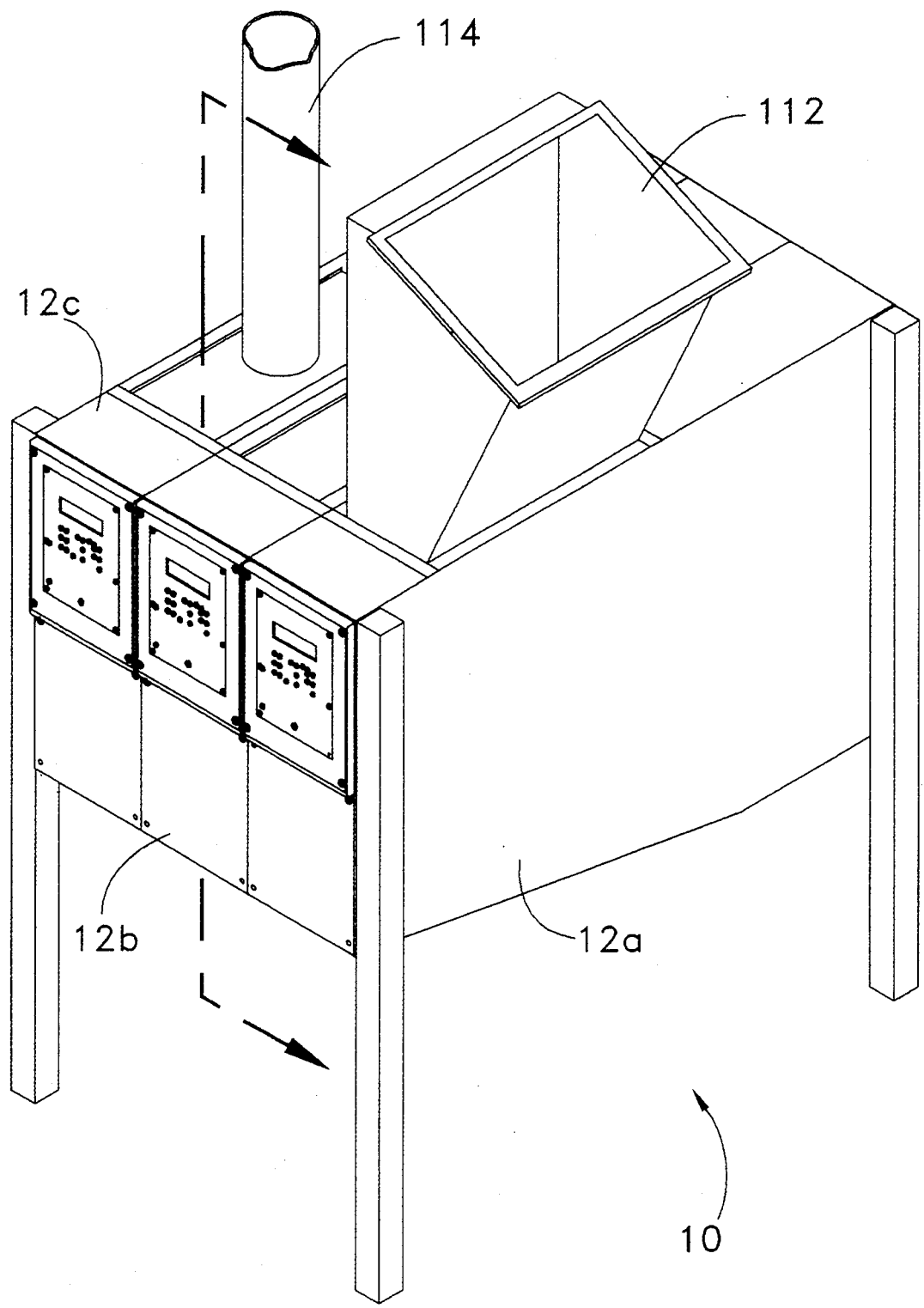
FIG. 1 is a perspective view of three of the apparatuses of the present invention assembled side-to-side and sharing a common gathering conveyor which discharges a homogeneous mixture of three ingredients according to a preselected recipe.

Illustrated in FIG. 1, generally at 10, is an apparatus for blending three constituent, flowable materials into a substantially homogeneous mixture wherein each of the three ingredients is present according to a preselected ratio or recipe. The mixing apparatus 10 includes three continuous flow weighting units 12, illustrated at 12a–c. The individual units 12a–c are positioned side-by-side into the assembly that is the mixing apparatus 10. Although the number of individual units 12 in the mixing apparatus 10 shown in FIG. 1 is three, the number of individual units 12 is not limited to three, but can include any number to correspond to the number of ingredients which are to be proportioned.

Although, for illustrative purposes, a single continuous flow weighting unit 12 will be described below and in FIGS. 2–6, it is to be understood that the other units are identical except where noted. The unit 12 includes an outer housing 14 that is supported on legs 16. A top portion of the housing 14 is open to provide an inlet 18 through which the flowable material or ingredient enters the unit 12. Adjacent the opening 18 is a control box 20 which contains the electrical control components for controlling the operation of the unit 12. A horizontal control conveyor or auger 22 runs longitudinally of the unit 12 inside an auger tube 24. The top portion of the auger tube 24 is open in the area of the inlet 18 and defines an intake end of the control auger 22. At the opposite or outlet end of the control auger 22, a bottom portion of the conveyor tube 24 is open, generally at 26, to allow the discharge of conveyed material from the control auger 22. A chute 28 is positioned below the outlet 26 and serves to confine and direct material exiting the control auger 22.

A weighing conveyor or auger 30 runs longitudinally of the unit 12 below the control auger 22. The weighing auger 30 rotates inside a weighing conveyor tube 32, the top portion of which is open at the intake end of the weighing auger 30 and below the chute 28 so that material discharged from the control auger 22 will be picked up for conveyance by the weighing auger 30. The weighing conveyor tube 32 includes an open bottom portion, generally at 34, at the outlet end of the weighing auger 30 so that material conveyed by the weighing auger 30 is discharged into a chute 36 which is open below the unit 12.

As illustrated in FIGS. 2 and 3, the control auger 22 and weighing auger 30 are rotated by a variable speed drive system, indicated generally at 38. The control auger 22 is driven by a variable speed motor 40 which is drivably connected to an end pulley 42 of the control augur 22 by a belt 44 and idler pulley 46. Similarly, the weighing auger 30 is driven by a variable speed electric motor 48 which is drivably connected to an end pulley 50 of the weighing conveyor 30 by a drive belt 52 and idler pulley 54.

The weighing auger 30 is supported for pivotal movement about a horizontal axis defined by a pair of horizontally and inwardly extended pins mounted on the sidewalls of the unit 12, one of which is illustrated in FIGS. 5 and 6 at 56. A mounting bracket 58 is secured at the intake end of the weighing tube 32 and serves as a mount for the variable speed motor 48 and its associated drive assembly. The mounting bracket 58 includes a pair of spaced apart side plates on either side of the conveyor tube 32, one of which is illustrated in FIGS. 5 and 6 at 60. Each side plate has an L-shaped slot 62 in which is received a corresponding one of the pins 56.

The weighing auger 30 is suspended near its outlet and from a load cell 64 by a spring 66 (FIG. 2). Accordingly, when the flowable material being proportioned by the unit 12 is present in the weighing auger 30, the weighing auger 30 will tend to pivot about the pins 56 in the clockwise direction as viewed in FIG. 2. This moment will increase the downward force on the load cell 64 in proportion to the weight of the material being carried by the weighing auger 30.

The rotational speed of each auger 22 and 30 is detected by an auger r.p.m. sensor 68 (FIG. 7) that consists of a flag (not shown) mounted on the auger that moves past a Hall-effect sensor (not shown) twice for each rotation of the corresponding auger. The unit 12 further includes a capacitive sensor 70 in the hopper of inlet 18 (FIG. 2). Sensor 70 is used to sense a full level of material in the hopper 18, as is well known in the art.

Figure 7:
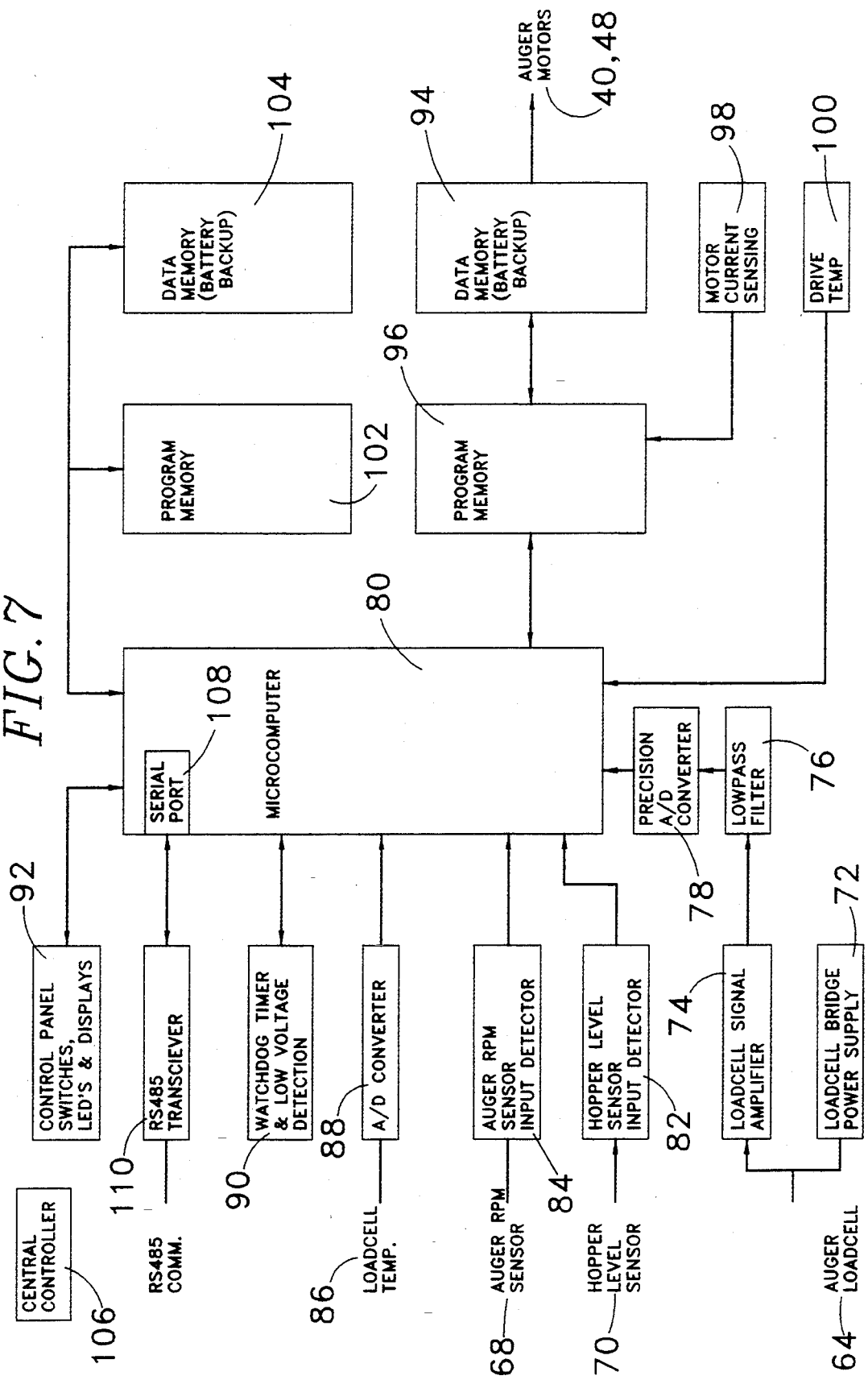
FIG. 7 is a schematic block diagram of electronic control circuitry of the invention.

The output of the load cell 64 and the auger r.p.m. sensors 68 are monitored by the electronic control system 20 (FIG. 7). The load cell 64 is connected to a power supply 72 and its output is amplified by the load cell signal amplifier 74, conditioned by a low pass filter 76, and converted to a digital signal by an analog/digital converter 78. Analog to digital conversions are triggered by the auger r.p.m. sensor described in the previous paragraph, for reasons discussed below. The digital signal is input into an 80C-154 microprocessor 80. The output of the capacitive sensor 70 is input into the microprocessor 80 by way of a hopper level sensor input detector 82.

The microprocessor 80 receives information regarding the rate of rotation of the auger 30 from the auger r.p.m. sensor 68 and the auger r.p.m. sensor input detector 84. The temperature of the load cell 64 is monitored by a sensor 86 which has an analog output that is converted to a digital signal by an analog/digital converter and input into the microprocessor 80.

The microprocessor 80 includes the usual watch dog timer and low voltage detection circuitry 90. Manual commands to the microprocessor 80 are input from a control panel 92, which also includes LEDs and visual displays for communicating information about the condition of the unit 12.

The microprocessor 80 is used to control the speed of the variable speed motors 40 and 48 by way of a drive power switching transistors 94 and a motor drive pulse width modulator 96. Heat and current overload protection for the motor drive 94 is provided by a motor current sensing circuit 98 connected with the motor drive pulse width modulator 96 and a drive temperature sensor 100. Instructions for the operation of the microprocessor 80 are stored in a program memory 102. Data collected regarding the operation of the unit 12 is stored in a data memory device 104.

With the components described above, the electronic control circuitry 20 is capable of controlling the operation of the unit 12. When a plurality of the units 12 are to be used to produce a mixture of a plurality of ingredients, the units may all stand-alone or may, alternatively, be connected to a central controller 106 which, in the preferred embodiment, is in communication with the microprocessor 80 through a serial port 108 and an RS-485 communication link 110. The central controller 106 may be quite similar to the electronic control system 20 but capable of commanding the operation of the plurality of units 12.

In operation of the unit 12, material is introduced into the inlet or hopper 18 by way of a material reservoir 112, a conveyor 114 (FIG. 1), or the like. Material present in the inlet 18 is picked up and carried by the control auger 22 to the outlet end thereof whereupon it is discharged through the chute 28. The material falls into the inlet of the weighing auger 30 which conveys it toward the outlet end thereof where it is discharged out of the unit 12 through the chute 36.

The material transport capacity of the control auger 22 is preferably less than that of the weighing auger 30. In the preferred embodiment, it is common to rotate both augers at approximately the same speed. The result of the above-described balancing of the carrying capacities of the two augers results in the weighing auger being less than full and the fill level of the weighing auger being kept approximately constant. By keeping the level of material in the weighing conveyor below its capacity, a high proportion of the material will be conveyed at the theoretical material transport rate of the auger 30. That is, losses which occur due to carrying of the material on the flighting and over the central shaft is substantially reduced by keeping the level of material in the weighing auger below the midline of the auger 30. It has been found with particulate, flowable materials, such as feedstuffs used in the preparation of feed rations for animals, that the actual conveyance rate of the weighing auger 30 is within one percent of the theoretical carrying capacity.

It is also important in maintaining the accuracy of the unit 12 to have a close fit between the weighing auger 30 and the weighing conveyor tube 32 at least along the bottom one-half of the auger. This will serve to reduce the "loss" or fall back of material between the periphery of the auger flighting and the inner wall of the conveyor tube 32. The close fit also insures that the auger 30 can be reliably emptied of material. This is necessary in order to zero the load cell 64.

Because of the desirability of the close fit, it has been found impractical to use conventional augers where both the auger flighting and the conveyor tube are metal. The required close fit causes excessive friction and wear of the two metal components, seriously reducing the useful life of the auger system. Accordingly, in the preferred embodiment, the auger tube 32 is made of an ultra high density polyethylene and the flighting of the auger 30 is steel. Satisfactorily long service lives have been obtained with this arrangement. Alternatively, metal conveyor tubes could be used if the flighting of the weighing auger were made of a wear-resistant plastic. Also, alternatively, both the auger flighting and the conveyor tube could be made of a wear-resistant plastic.

Alternatively, the auger flighting could be fixed inside the conveyor tube whereby the tube and auger would rotate together.

Figure 8:
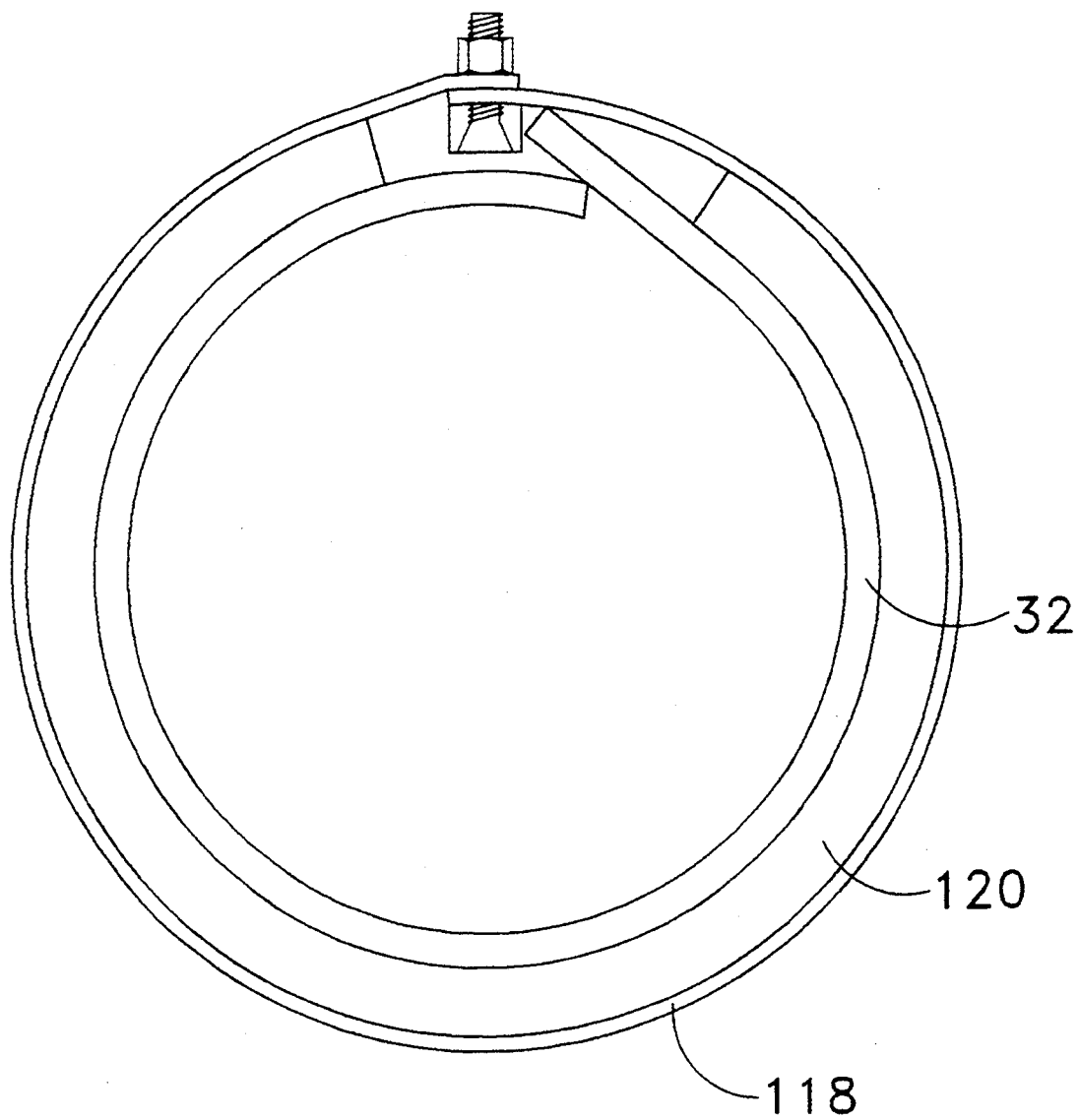
FIG. 8 is a cross-sectional view of an auger tube for use with the invention.

The desirable close fit makes the auger system sensitive to temperature variations. The conveyor tube is observed to expand and contract to a relatively higher degree with temperature variations than does the diameter of the auger flighting. Accordingly, a satisfactorily close fit at a high temperature may result in binding of the auger flighting in the conveyor tube at a low temperature. It has been found that constructing the auger tube 32 so that it has an overlapping portion, such as is shown in FIG. 8, will allow for a desired flexibility in diameter of the conveyor tube 32. A steel tube 118 of a somewhat larger diameter is positioned around the circumference of the conveyor tube 32. A polyethylene foam cushion 120 is interposed between conveyor tube 32 and the steel tube 118 to urge the conveyor tube 32 to a close fit about the auger while allowing for thermal expansion and allow for slight imperfections of the auger components.

If the entire auger contents were to be weighed each revolution of the weighing auger 30, the amount of ingredient dispensed is calculated as follows:

$$I=(W_2)(P/L)$$

where:
I = ingredient weight dispensed per revolution
$W_2$ = weight of ingredient as would be measured by weighing both ends of the auger 30
P = pitch length of auger 30 flighting
L = length of auger 30

As an example, assume that the pitch is 3 inches and the length is 30 inches. Then each revolution produces $I=W_2/10$ lbs. In 10 revolutions, an entire auger-full of material is dispensed and $I=W_2$ lbs.

In practice, the contents are weighted every one-half revolution of the weighing auger 30 and only the discharge end is weighed. Also the loadcell 64 is positioned somewhat beyond the end of the auger 30. The above equation is then modified as follows:

$$I=(W_1)(P/L)(D_1/2D_2)$$

where:
$W_1$ = weight of ingredient as measured on one end of auger 30
$D_1$ = horizontal distance from the pivot point to the loadcell 64
$D_2$ = horizontal distance from the pivot point 56 to the center of mass of ingredient in the auger 30

This equation can be simplified by realizing that $D_2=L/2$ if end-effects are ignored:

$$I=(W_1)(PD_1/L^2)$$

In practice, a calibration constant K is determined experimentally for a particular weighing auger. This is more accurate than the theoretical equations derived above because of end-effects. The largest end-effect which is not accounted for in the theoretical equations is the fact that material will slide out of the outlet end of the auger 30 before it is pushed past the end of the auger tube 32. This will vary somewhat for different materials according the angle of repose of the material.

$$I=(K)(W_1)$$

where K is an experimentally determined calibration constant.

This calculation is performed each half-revolution of the auger 30. Flow rate of material is then simply the ingredient weight as calculated above divided by the time interval for the half-revolution. Accumulated weight of dispensed material is the accumulated total of the weights calculated for each half-revolution.

The microprocessor 80 thus continuously reads the weight of the material in the auger 30 and determines the residence time by measurement of the rotational speed of the auger 30 as obtained from the auger r.p.m. sensors 68. The calculated flow rate is compared to the desired flow rate set by the operator at the control panel 92 and the speeds of the motors 40 and 48 are adjusted accordingly to obtain the preselected mass flow rate for the material. As has been discussed, a plurality of the units 12 can be assembled to create a feed blending and mixing system (FIG. 1). Flow rates for the individual ingredients are set for each unit 12a-c to dispense its ingredient at the desired weight flow rate in proportion to the desired concentration of that ingredient in the final mixture. Ingredients dispensed from each of the units 12a-c are collected in a common, shared gathering auger 116 (FIGS. 2 and 4) for transport to a remote location.

Since material flow is controlled by the speed of the control auger 22, it is not theoretically necessary to vary the speed of the weighing auger 30. However, if the weighing auger speed were held constant, at low flow rates the weight would be so small that it cannot be accurately measured, and at high flow rates the weighing auger would be overfilled. Therefore, in order to offer a wide range of flow rates, it is preferable to vary the speed of the weighing auger 30 in general correspondence with adjustments in the speed of the control auger. If the weighing auger 30 runs at the same speed as the control auger 22, the fill of material in the weighing auger 30 is nearly constant, and it is expected that the accuracy will be thereby increased. In tests, it has been found that if a weighing auger 30 with a center tube is loaded more than one-half full, the theoretical flow rate of materials is somewhat higher than actual flow rate. As discussed above, this is most likely due to material falling back over the flighting which results in a longer residence time in the auger than that calculated from auger speed.

Because loadcells and analog circuitry have a tendency to drift over time, it is important to zero the loadcell regularly. To obtain the empty weight of the weighing auger 30, it is run empty at start-up. The empty weight is saved for use during operation. A new zero weight can be done either on a periodic time basis or upon a preselected change in temperature, or both.

The particular design of the preferred embodiment enhances the accuracy of the system. By weighing only one end of the weighing auger 30, the weight of the motor 48 and its associated drive assembly is removed from the loadcell 64. Further, by centering the pins 56 below the chute 28, any moment on the weighing conveyor 30 as a result of the momentum of the material discharged from the control auger 22 is minimized. Additionally, since the distribution of the material entering the weighing auger 30 creates a spread in the residence time of the material in the auger, by ignoring the weight at the intake end, small variations in residence time become insignificant.

In practice, measuring the weight of the weighing auger 30 accurately is affected by cyclic variations in weight as the weighing auger 30 rotates. These effects are due to two principal causes: (a) the augured material doesn't exit the weighing auger smoothly, but rather is dumped in packets as the flighting turns past the end of the conveyor tube 32; and (b) any unbalance of the rotating weighing auger 30 results in vibrations with a frequency at the rotational speed of the weighing auger 30. Both sources of error can be reduced or eliminated by measuring the weight synchronously with auger position. By measuring twice per revolution, errors due to imbalance tend to cancel if two consecutive readings are summed. Any remaining dynamic errors are reduced by low pass filtering at 76 of the signal from the load cell 64, with the cut off frequency somewhat below the frequency of operation.

It is to be noted that the vertical position of the pivot point of the weighing auger 30 is set at approximately the vertical position of material in the auger. Because the material is accelerated horizontally as it falls into the weighing auger 30, positioning the pivot point at the vertical position of material in the auger minimizes the torque at the pivot point due to this material acceleration.

Although the invention has been described with respect to a preferred embodiment thereof, it is to be also understood that it is not to be so limited since changes and modifications can be made therein, such as the use of belt or cable conveyors in place of the control and/or weighing augers, which are within the full intended scope of this invention as defined by the appended claims.

I claim:

1. An apparatus for continuous flow weighing of a flowable material, comprising:
   (a) an input for receiving the flowable material;
   (b) a control conveyor having a first intake end positioned to receive the flowable material from said input and a second, output end;
   (c) a weighing conveyor having a first, intake end positioned to receive the flowable material from said second, output end of said control conveyor and an output end, said output end of said weighing conveyor having a downward force;
   (d) an output for delivering the flowable material from said output end of said weighing conveyor;
   (e) means supporting said weighing conveyor for pivotal movement about a horizontal axis near said first intake end of said weighing conveyor;
   (f) means for determining the downward force near the output end of said weighing conveyor;
   (g) means for monitoring the speed of said weighing conveyor; and
   (h) means for determining the mass flow rate of the material delivered by the apparatus.

2. An apparatus as defined in claim 1, wherein said control conveyor has a material transport rate and wherein said weighing conveyor has a maximum material transport rate, further comprising means for maintaining the material transport rate of said control conveyor at less than the maximum material transport rate of said weighing conveyor.

3. An apparatus as defined in claim 1, wherein said horizontal axis of pivotal movement of said weighing conveyor is centered relative to said flowable material entering said first intake end of said weighing conveyor and is positioned substantially at a vertical fill level of said flowable material in said weighing conveyor.

4. An apparatus as defined in claim 1, further comprising a material reservoir hopper in material communication with said input.

5. An apparatus as defined in claim 1, further comprising an input conveyor in material communication with said input.

6. An apparatus as defined in claim 1, wherein said control conveyor includes a control auger rotated inside a control conveyor tube and wherein said weighing conveyor includes a weighing auger rotated inside a weighing conveyor tube.

7. An apparatus as defined in claim 6, wherein said control auger and said weighing auger are rotated at substantially the same speed.

8. An apparatus as defined in claim 6, wherein said weighing auger is made of metal and is rotated inside said weighting conveyor tube which is made of wear-resistant plastic.

9. An apparatus as defined in claim 6, wherein said weighing auger is made of wear-resistant plastic and is rotated inside said weighting conveyor tube which is made of metal.

10. An apparatus as defined in claim 6, wherein both said weighing auger and its corresponding conveyor tube are made of wear-resistant plastic.

11. An apparatus as defined in claim 6, wherein said weighing auger rests inside said weighting conveyor tube and is in contact with said said weighting tube at a plurality of positions between said input and output ends of said weighing conveyor.

12. An apparatus as defined in claim 6, wherein said weighing conveyor and its corresponding conveyor tube are sized to convey effectively all material delivered to said intake end thereof continuously to said output end thereof at substantially the theoretical transport rate of said weighing conveyor.

13. An apparatus as defined in claim 1, wherein said downward force measuring means includes a load cell.

14. An apparatus as defined in claim 13, further comprising means for zeroing said load cell at a regular time interval when said weighing auger is empty of said flowable material.

15. An apparatus as defined in claim 13, further comprising means for zeroing said load cell at a predetermined change in temperature.

16. An apparatus as defined in claim 6, wherein said weighing auger has a period of rotation and wherein said downward force is measured synchronously with the period of rotation of said weighing auger.

17. Apparatus as defined in claim 2, wherein the material transport rate of said control conveyor is less than the maximum material transport rate of said weighing conveyor.

18. An apparatus for continuous flow weighing of a plurality of flowable ingredients to create a uniform mixture of said ingredients in a preselected recipe of said ingredients, comprising:
   (a) a plurality of continuous flow weighing apparatus each of which comprises
       (i) an input for receiving the flowable material,
       (ii) a control conveyor having a first intake end positioned to receive the flowable material from said input and a second, output end,
       (iii) a weighing conveyor having a first, intake end positioned to receive the flowable material from said second, output end of said control conveyor and an output end, said output end of said weighing conveyor having a downward force,
       (iv) an output for delivering the flowable material from said output end of said weighing conveyor,
       (v) means supporting said weighing conveyor for pivotal movement about a horizontal axis near said first intake end of said weighing container,
       (vi) means for determining the downward force near the output end of said weighing conveyor,
       (vii) means for monitoring the speed of said weighing conveyor,
       (viii) means for determining the mass flow rate of the material,
       (ix) wherein said control conveyor has a material transport rate and wherein said weighing conveyor has a maximum material transport rate, and
       (x) means for maintaining the material transport rate of said control conveyor at less than the maximum material transport rate of said weighing conveyor;
   (b) wherein each of said ingredients is received into said input for receiving the flowable material of a selected one of said plurality of said apparatus;
   (c) means in material communication with said outputs of each of said plurality of apparatus for commingling said plurality of said ingredients; and
   (d) means for controlling each of said plurality of said apparatus so as to deliver each of said ingredients at a rate corresponding to the total delivery rate of all ingredients in the same ratio as each of said ingredients bears to the uniform mixture.

19. An apparatus as defined in claim 18 wherein said commingling means is a gathering conveyor which receives each proportioned ingredient.

* * * * *

UNITED STATES PATENT AND TRADEMARK OFFICE
CERTIFICATE OF CORRECTION

PATENT NO. : 5,423,456
DATED : June 13, 1995
INVENTOR(S) : Larry Van Arendonk and Paul Schroder It is certified that error appears in the above-indentified patent and that said Letters Patent is hereby corrected as shown below:

Title page, item [75],
Inventors, change "Larry V. Arendonk" to --Larry Van Arendonk--.

In Fig. 1, the numeral --2-- should be added to the figure in association with the section lines to clearly illustrate the view of Fig. 2.

In Fig. 2, the reference numeral --22-- should be added to indicate part number 22.

In Fig. 5, lead lines should be added which associate the reference numerals with the appropriate parts; therefore, replace Fig. 5 with included herewith Fig. 5.

In Fig. 6, the lead line associated with reference numeral 12 should end with an arrow; therefore, replace Fig. 6 with included herewith Fig. 6.

In Fig. 7, the text identifying part 96, "PROGRAM MEMORY" should be changed to --3-PHASE MOTOR DRIVE PWM--.

Also in Fig. 7, the text identifying part 94, "DATA MEMORY (BATTERY BACKUP)" should be changed to --3-PHASE MOTOR DRIVE SW--; therefore, replace Fig. 7 with included herewith Fig. 7.

UNITED STATES PATENT AND TRADEMARK OFFICE
CERTIFICATE OF CORRECTION

Page 2 of 3

PATENT NO. : 5,423,456
DATED : June 13, 1995
INVENTOR(S) : Larry Van Arendonk and Paul Schroder It is certified that error appears in the above-indentified patent and that said Letters Patent is hereby corrected as shown below:

In column 3, line 28, change "augur" to --auger--.

In column 3, line 54, after "of" delete "each"; after "auger" delete "22 and".

In column 3, line 58, after "of the" delete "corresponding".

In column 3, line 63, change "sensors" to --sensor--; after "68" change "are" to --is--.

In column 3, lines 63-64, after "system" add --within the control box--.

In column 4, line 12, after "converter" add --88--.

In column 4, line 21, after "of" delete "a".

In column 4, line 32, after "control circuitry" add --within the control box--.

In column 6, line 42, change "sensors" to --sensor--.

In column 7, line 6, change "flighting" to --central shaft--.

UNITED STATES PATENT AND TRADEMARK OFFICE
CERTIFICATE OF CORRECTION

PATENT NO. : 5,423,456
DATED : June 13, 1995
INVENTOR(S) : Larry Van Arendonk, et. al.

It is certified that error appears in the above-indentified patent and that said Letters Patent is hereby corrected as shown below:

In column 7, line 32, change "augured" to --augered--.

Signed and Sealed this

Seventh Day of May, 1996

Attest:

BRUCE LEHMAN

Attesting Officer

Commissioner of Patents and Trademarks